JACKSON & CLARK.
Churn.
No. 32,250.
Patented May 7, 1861.
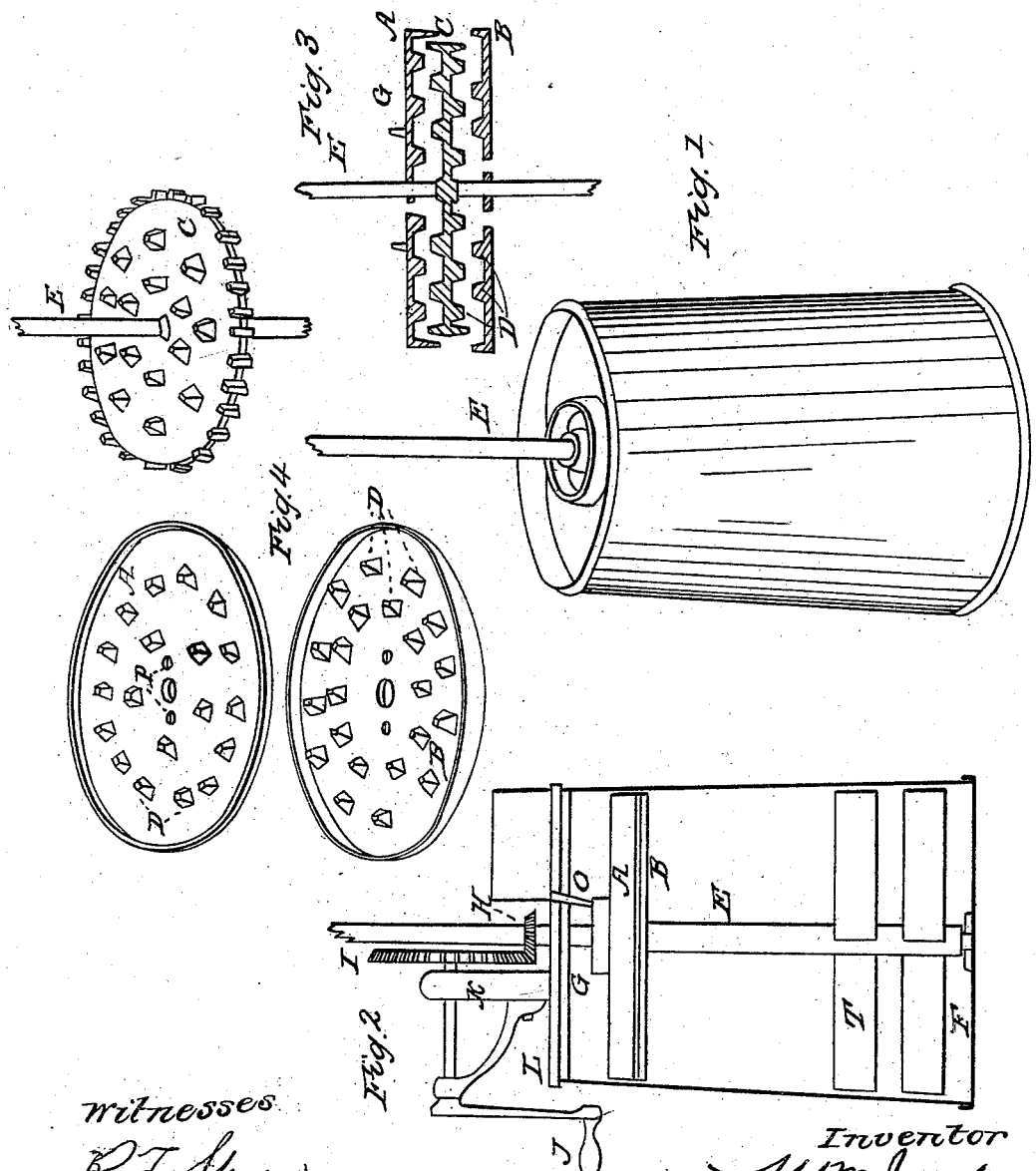

UNITED STATES PATENT OFFICE.

WM. JACKSON AND J. CLARKE, OF SYRACUSE, NEW YORK.

CHURN.

Specification of Letters Patent No. 32,250, dated May 7, 1861.

*To all whom it may concern:*

Be it known that we, WILLIAM JACKSON and JOSEPH CLARKE, of Syracuse, in the county of Onondaga and State of New York, have invented a new and useful Improvement in Churns, of which the following is a full, clear, and exact description, reference being had to the annexed drawings, making part of this specification.

The nature of our invention consists in providing disks used in churns, and between which the milk or cream is made to flow, with concentric rows of teeth as hereinafter stated for the purpose of creating the greatest possible amount of agitation in the cream.

It also consists in the use of a center wheel placed so as to revolve between the two disks, which is also provided with concentric rows of teeth upon both surfaces corresponding with and running between the rows upon the inner surfaces of the disks.

In the drawings Figure 1 represents the churn which may be made round or square. Fig. 2, represents a section of the churn. Fig. 3, represents a section of the disks (A and B) and the center wheel (C). Fig. 4 shows the inner surfaces of the disks (A) and B upon which are concentric rows of teeth (D).

Upon the center wheel (C) are teeth similar to those on the disks A and B, and and so placed that when the disks are put together (the wheel being between them) the teeth on the wheel will run between the rows of teeth on the disks.

The disks (A and B) are placed in the upper part of the churn so that they can be easily removed.

The wheel (C) is placed between the disks and attached to the shaft (E) which passes through the cover of the churn, through the disks (A and B) and rests in a socket (F) in the bottom of the churn. To the shaft (E) is also attached one or more beaters T.

Upon the upper surface of the upper disk (A) is a cup G to receive the milk or cream. Upon the upper part of the shaft (E) attach a cog wheel (H) working with the wheel (I) which latter is made to revolve by the crank (J), the wheel (I) and crank (J), being attached by the standard (K) to the cover (L) of the churn.

The operation is as follows: First set the wheel C in rapid motion by the crank (J), the disks A and B remaining stationary. Then pour in the milk or cream through the cover by the conductor (O), and it passes through the upper disk near the center by the openings (P), thence between the upper disk and the wheel (C), and as the upper and lower disks are closed tightly together, the milk will have to pass from the center to the circumference between the wheel and upper disk, and from the circumference to the center below the wheel, and pass from the disks into the chamber below, through the openings (R) in the lower disk. The tendency of the wheel while in rapid motion is to prevent the too free flow of the milk through the disks, and by retaining it between the disks until it has had the effect of a number of revolutions of the wheel, the butter globules are all broken, and are to be gathered together in the lower part of the churn. It has been found that the great amount of friction in the passage of the cream through the disks caused by the teeth, is sufficient to churn it thoroughly in being once passed through.

What we claim as our invention and desire to secure by Letters Patent is—

The employment of the disks A. and B. with their concentric rows of teeth, as specified in combination with the central wheel C. the whole constructed and operating as herein before described for the purpose set forth.

WM. JACKSON.
JOSEPH CLARKE.

Witnesses:
R. F. STEVENS,
J. HUNT.